Nov. 21, 1939.  B. W. JONES  2,180,527
TRANSMISSION
Filed Aug. 28, 1937   2 Sheets-Sheet 1

INVENTOR.
Burr W. Jones
BY
Clinton S. Jones
ATTORNEY.

Nov. 21, 1939.  B. W. JONES  2,180,527
TRANSMISSION
Filed Aug. 28, 1937  2 Sheets-Sheet 2

INVENTOR.
Burr W. Jones
BY Clinton S. Jones
ATTORNEY.

Patented Nov. 21, 1939

2,180,527

UNITED STATES PATENT OFFICE 2,180,527

TRANSMISSION

Burr W. Jones, Elmira, N. Y., assignor, by mesne assignments, to Bendix Aviation Corporation, South Bend, Ind., a corporation of Delaware Application August 28, 1937, Serial No. 161,504

17 Claims. (Cl. 192—6)

The present invention relates to transmissions for velocipedes and the like and more particularly to a combined variable speed gearing and brake unit incorporated in the rear wheel hub of a bicycle.

It is an object of the present invention to provide a novel variable speed gearing and brake unit which is efficient and reliable in operation while being simple and economical in construction.

It is another object to provide such a device in which the parts, and in particular the gear elements, are sturdy and rugged in construction, while the overall dimensions and weight of the unit are reduced to a minimum.

It is a further object to provide such a device in which the stresses on the parts of the transmission are self-contained in respect to the various sub-assemblies thereof.

It is another object to provide such a device in which the operation of the brake is uniformly efficient irrespective of gear changes in the transmission.

It is another object to provide such a device in which there are no parts projecting axially from the hub which might be injured by careless operation of the vehicle.

It is another object to provide such a device which may be easily and simply sealed against the intrusion of foreign matter such as dust or moisture.

It is a further object to provide such a device in which the construction of the transmission is such as to preclude the possibility of jamming or locking up in shifting from one gear ratio to another.

It is a further object to provide such a device embodying a brake of large area and diameter at all times under efficient and accurate control of the operator.

It is a further object to provide such a device comprising a small number of parts of simple form, subject to economical and rapid manufacture.

Further objects and advantages will be apparent from the following description taken in connection with the accompanying drawings in which.

Figures 1, 2:
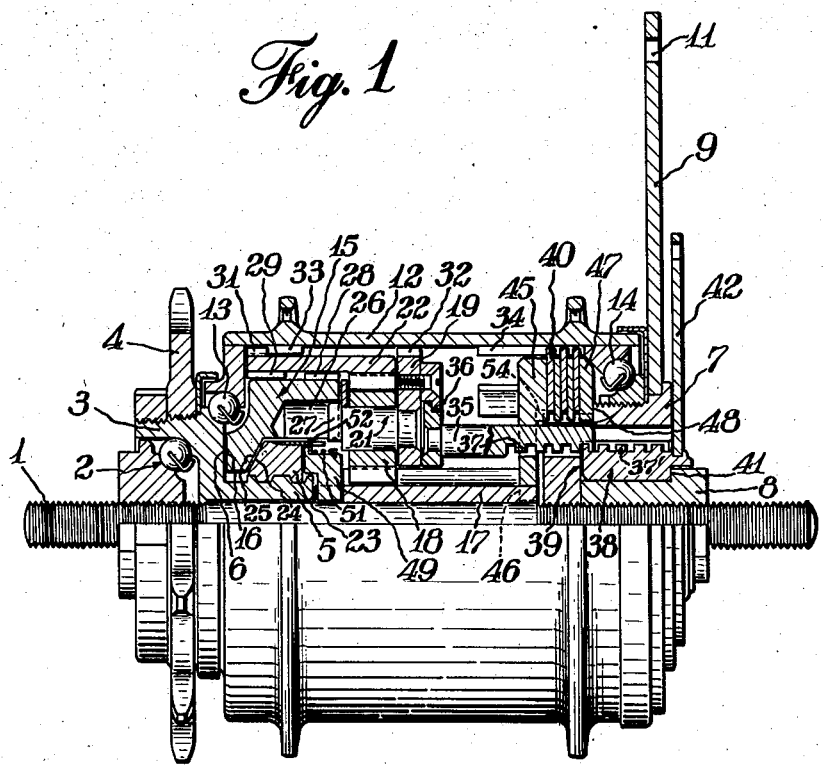
Fig. 1 is a side elevation partly in section of a preferred embodiment of the invention showing the gearing in high gear or overdrive position, and the transmission in idle or coasting condition.
Fig. 2 is a similar view showing the gearing in the direct drive or unity ratio position, the transmission being in the active driving condition.

Referring first to Fig. 1 of the drawings, there is illustrated a stationary axle member 1 adjacent one end of which a driving member 3 is rotatably mounted as by means of a suitable anti-friction bearing 2. A sprocket 4 is fixedly mounted on the driving member 3 in any suitable manner and is rotated by a driving chain, not illustrated. The driving member 3 is provided with a reduced threaded extension 5 loosely surrounding the axle 1, the intermediate portion of the driving member being formed with a clutch surface 6 which is preferably substantially radial and may be formed with serrations if desired.

Figure 4:
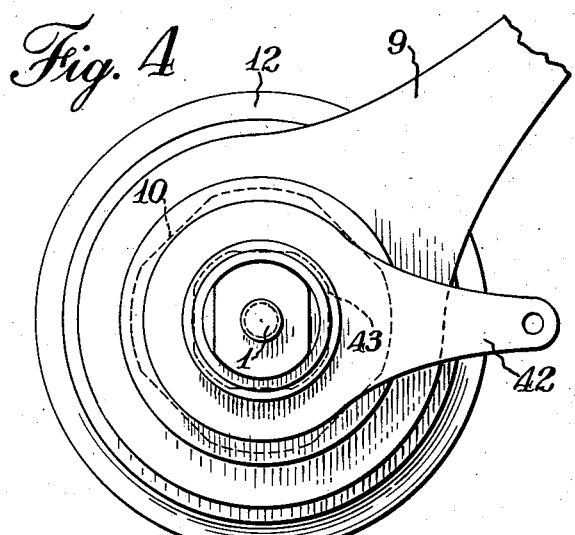
Fig. 4 is an end elevation of the device, looking from the right in Fig. 3.
Figure 5:
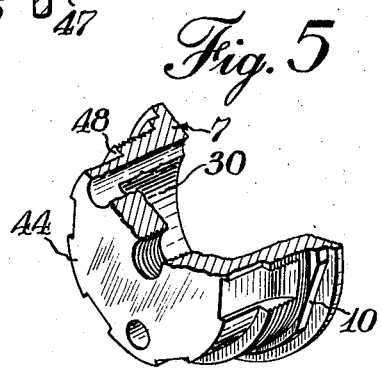
Fig. 5 is a detail in perspective, partly broken away, of the anchor member for the brake mechanism and shifting means.

An anchor member 7 (Fig. 5) is fixedly mounted on the axle 1 in any suitable manner as by being threaded thereon and locked in position by means of a lock nut 8. Rotation of the anchor member 7 is prevented by a torque arm 9 fitted on a polygonal portion thereof as indicated in dotted lines at 10 in Fig. 4, and having its free end provided with an opening 11 adapted to receive a strap, not illustrated, for clamping the same to a frame member of the vehicle.

Figure 6:
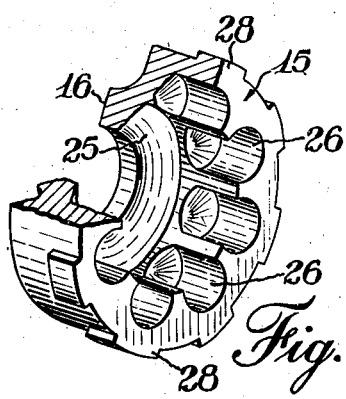
Fig. 6 is a detail in perspective, partly broken away, of the transmission member which connects the gearing to the driving member.

A wheel hub member 12 of generally cylindrical shape is rotatably mounted on the driving member 3 as by means of an anti-friction bearing 13, and on the anchor member 7 by means of anti-friction bearing 14. Means for transmitting rotation from the driving member 3 to the hub 12 is provided in the form of a transmission member 15 (Fig. 6) having a clutching surface 16 adapted to cooperate with the clutch surface 6 of the driving member 3, and a train of planetary gearing comprising a sun gear 17 slidably mounted on an intermediate smooth portion of the axle 1, a set of planet gears 18 meshing with the sun gear and mounted in a planet carrier 19 by means of bearing studs 21, and an orbit gear 22 surrounding and meshing with the planet gears 18. The planet carrier 19 is slidably mounted in the hub 12 to assume any one of three operative positions at different gear ratios, and the orbit gear 22 is swiveled to the planet carrier for longitudinal movement therewith by suitable means such as a split ring 20 anchored on the ends of studs 21 in the planet carrier. The sun gear 17 is made sufficiently long to cooperate with the planets 18 in any of their operative positions.

Means for clutching the transmission member 15 to the driving member 3 responsive to forward rotation of the driving member is provided in the form of a clutch member 23 threaded on the extended portion 5 of the driving member 3 and provided with a clutch surface 24 arranged to bear against a corresponding clutch surface 25 on the transmission member. The threads of the driving member 3 and clutch member 23 are so arranged that when the driving member rotates in a forward direction, the clutch member 23 moves to the left in Fig. 1 and clamps the transmission member 15 to the driving member.

Means are provided for selectively keying the planet carrier 19 and the orbit gear 22 to the transmission member 15 and hub 12 in such a manner as to provide three optional gear ratios between the transmission member and hub. For this purpose, the transmission member 15 is provided with openings 26 adapted to receive extensions 27 of the studs 21 in the planet carrier and is also provided with radially extending splines 28. The orbit gear 22 is provided with inwardly extending splines 29 in position to cooperate with the splines 28 of the transmission member, and with outwardly extending splines 31. The planet carrier 19 is provided with outwardly extending splines 32, and the hub 12 is provided with inwardly extending splines 33, in position to cooperate with the splines 31 of the orbit gear, and with inwardly extending splines 34 adapted to cooperate with the splines 32 of the planet carrier.

Means are provided for positively shifting the planet carrier 19 and orbit gear 22 as a unit longitudinally within the hub in order to select the desired gear ratio by moving the proper splined connections into cooperative relationship. As here illustrated, this means is in the form of a plurality of shifting bars 35 slidably mounted in the anchor member 7 and provided with a swivel connection indicated generally at 36 with the planet carrier 19. The portions of the shifting bars 35 within the anchor member 7 project within a central opening 30 (Fig. 5) of the anchor member and are gashed as indicated at 37 by means of a suitable tap preferably having square threads so as to cooperate with the threads 37' of a rotatable shifting member 38 journalled on the lock nut 8 and prevented from longitudinal movement thereon by abutment with the bottom 39 of the anchor member on the one hand, and a shoulder 41 on the lock nut on the other hand. Manually operable means for rotating the shifting member 38 is provided in the form of an arm 42 non-rotatably connected thereto as indicated by the dotted lines 43 in Fig. 4 and arranged to be actuated through any suitable form of transmitting linkage, either rigid or yieldable, from a lever or other suitable control means convenient to the operator.

Figure 7:
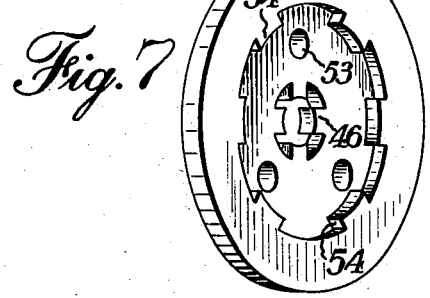
Fig. 7 is a detail in perspective of the brake controlling member.

Brake mechanism for frictionally connecting the hub member 12 to the anchor member 7 is provided in the form of a plurality of friction discs 40 engaging alternately the splines 34 in the interior of the hub 12 and splines 44 (Fig. 5) on the periphery of the anchor member 7. An actuating member for applying the brake mechanism by compressing the discs is provided in the form of a circular plate 45 (Fig. 7) bearing against the innermost disc 40 and splined on and arranged in abutting relation with the adjacent end of the sun gear 17 as indicated at 46. Motion of the discs to the right responsive to pressure of the actuating member 45 is limited by an abutment ring 47 seated against a shoulder 48 on the anchor member 7.

Means for applying the brake mechanism responsive to backward rotation of the driving member 3 is provided in the form of a thrust ring 49 splined on and in abutting relation with the end of the sun gear 17 opposite to that on which the actuating member 45 is mounted, and adjacent to the threaded clutch member 23. Motion of the clutch member 23 to the right in Fig. 1 causes it to engage the thrust ring 49 and apply pressure thereto which is transmitted through the sun gear 17 to the brake actuating member 45 to apply the brake.

Figure 3:
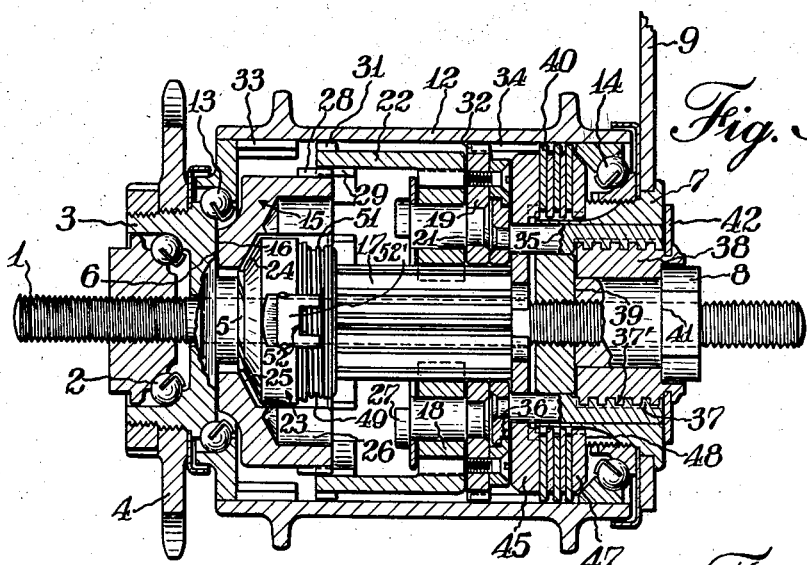
Fig. 3 is a vertical sectional view of the transmission and brake unit, certain of the parts being shown in elevation, the gearing being illustrated in the underdrive or low gear position, and the brake being applied.

Means for insuring traversal of the threaded clutch member 23 when the driving member is rotated in either direction is provided in the form of a light friction detent member. Such a detent is here shown as a disc 50 non-rotatably connected to the clutch member 23 by means of a lug 52 engaging in a quill 52' fixed to the clutch member (Figs. 2 and 3). The disc 50 is held in frictional engagement with a flange 50' on the thrust ring 49, by a spring 51 held on the thrust ring by a lock ring 51'. The retarding effect of the disc 50 on the clutch member 23 may readily be adjusted by bending the spring or by substituting a spring of different tension.

Shifting bars 35 are arranged to traverse openings 53 in the brake actuating member 45 which is consequently prevented from rotation and thus prevents the rotation of the sun gear 17 by virtue of the interlocking connection 46 therebetween. The rotative immobility of the sun gear so secured is utilized in the operation of the transmission in either high or low gear, and is further used to prevent rotation of the thrust ring 49 and thus render effective the detent 50 to insure traversal of clutch member 23. If desired, the actuating member 45 may be provided with interior splines 54 adapted to cooperate with the splines 44 of the anchor member 7 and thus transmit the rotative reactions of the sun gear 17 directly to the anchor member 7 without interfering with the free sliding action of the shifting bars 35 in the anchor member.

In the operation of the device, and assuming the parts in the positions illustrated in Fig. 1, forward rotation of the driving member 3 causes the clutch member 23 to move to the left and clamp the transmission member 15 rigidly to the drive member. Inasmuch as the extensions 27 of the studs 21 in the planet carrier 19 are positioned within the openings 26 of the transmission member 15, and the splines 28 of the transmission member are not in registry with the splines 29 in the orbit gear 22, the planet carrier 19 is caused to rotate at the angular speed of the driving member. Since the sun gear 17 is prevented from rotation by its connection with the brake actuating member 45, the orbit gear 22 is caused to rotate with an angular velocity greater than that of the driving member and planet carrier, which rotation is transmitted to the axle hub 12 by virtue of the engagement of splines 31 on the orbit with the splines 33 in the hub. The hub 12 is thus rotated with a high gear ratio suitable, in the case of use of this device on a bicycle, for operation of the vehicle on slight downgrades or on the level with favorable wind conditions.

When the operator desires to utilize a lower gear ratio as for ordinary level riding or on slight upgrades, it is merely necessary to rotate the arm 42 of the shifting member 38 through a short arc of travel sufficient to draw the shifting bars 35 to the right and thus move the planet carrier 19 and orbit gear 22 to the right sufficiently to disengage the ends 27 of the studs 21 from the openings 26 in the transmission member 15, and to cause the splines 29 of the orbit gear 22 to engage with the splines 28 of the transmission member 15. This position of the parts is illustrated in Fig. 2 where it will be seen that the transmission member 15 is locked to the hub 12 by virtue of the engagement of the splines 28 of the transmission member with the splines 29 of the orbit gear 22, and the engagement of the external splines 31 of the orbit gear with the splines 33 in the hub. The hub 12 is thus caused to rotate at the same speed as the driving member 3, the planetary gearing then being permitted to rotate idly inasmuch as the planet carrier 19 is entirely free.

When it is desired by the operator to utilize a low gear ratio for climbing steep grades, it is merely necessary to further rotate the shifting arm 42 so as to move the planet carrier 19 and orbit gear 22 still further to the right into the positions illustrated in Fig. 3. As here shown, the transmission member 15 is connected to the orbit gear 22 by the interengagement of splines 28 and 29 on the transmission member and orbit gear respectively, and by virtue of the stationary anchorage of the sun gear 17, the planet carrier 19 is thus caused to rotate at low speed. This low speed rotation is transmitted from the planet carrier 19 to the hub 12 by virtue of the engagement of splines 32 on the planet carrier with the splines 34 in the hub so that the hub is now rotated from the driving member at a low gear ratio with corresponding mechanical advantage. It will be noted that the dimensions of the parts, and in particular the lengths of the various splines, are such that each driving connection is completely disengaged before another becomes operative. It is thus impossible to cause locking or jamming of the drive through inadvertent partial actuation of the shifting means.

If at any time the operator ceases to rotate the driving member 3, the clutch member 23 immediately backs away from the transmission member 15 by virtue of the overrunning of the transmission member so that the transmission is freed from the driving member, and the hub can overrun freely as long as the momentum of the vehicle persists.

When it is desired to retard the vehicle by the application of the brake, it is merely necessary for the operator to backpedal and rotate the driving member 3 backward through a small arc of movement. The clutch member 23 is thus caused to engage and move the thrust ring 49, which motion is transmitted through the slidably mounted sun gear 17 to the brake actuating member 45 to compress the brake discs. It will be noted that this operation of the brake takes place in exactly the same manner irrespective of the position of the planet carrier 19 and orbit gear 22, and thus irrespective of the gear ratio of the transmission which is at that time operative.

It will be understood that the rotary gear shifting device herein disclosed is particularly well adapted for sealing against the admission of dirt or moisture, and that by the use of sealed ball bearings of any suitable type, the entire hub may be made substantially dust and oil-tight.

Although but one form of the invention has been shown and described in detail, it will be understood that other forms are possible and that various changes may be made in the proportions and arrangements of the parts without departing from the spirit of the invention as defined in the claims appended hereto.

What is claimed is:

1. In a variable speed transmission and brake, a stationary axle, a driving member journalled thereon, a transmission member having an overrunning clutch connection therewith, an anchor member fixed on said axle, a wheel hub rotatably mounted on the driving and anchor members, means comprising planetary gearing for connecting the transmission member to rotate the hub, including a sun gear slidably mounted on the axle, brake means for frictionally connecting the hub and anchor member, and means whereby backward rotation of the driving member causes longitudinal movement of the sun gear to control the brake means.

2. In a variable speed transmission and brake, a driving member, a driven member, braking means for the driven member, means including planetary gearing for rotating the driven member from the driving member, said gearing including a sun gear, and means whereby backward rotation of the driving member transmits longitudinal movement through the sun gear to the braking means to apply the brake.

3. A transmission and brake unit for vehicles including a fixed axle, a hub rotatably mounted thereon, driving means including an automatically engageable clutch, brake mechanism, a transmission connecting the driving means to the hub including planetary gearing comprising a sun gear, and means whereby backward rotation of the driving means causes longitudinal movement of the sun gear to apply the brake mechanism.

4. A transmission and brake unit for vehicles including a fixed axle, a hub rotatably mounted thereon, driving means including an automatically engageable clutch adjacent one end of the hub, brake mechanism including a brake actuating member adjacent the other end of the hub, a transmission connecting the driving means to the hub including planetary gearing comprising a non-rotatable sun gear slidably mounted on the axle intermediate the driving means and the brake mechanism, and means whereby backward rotation of the driving means causes longitudinal movement of the sun gear to apply the brake mechanism.

5. A transmission and brake unit for vehicles including a fixed axle, a hub rotatably mounted thereon, driving means, brake mechanism for the hub, transmission means including planetary gearing comprising orbit, sun and planet gears and a planet carrier, means operable by longitudinal movement of the orbit gear and planet carrier to selectively connect the same to the hub and driving means, and means operable by longitudinal movement of the sun gear to apply the brake mechanism.

6. A variable speed transmission and brake unit for vehicles including a stationary axle, an anchor member fixed thereon, a driving member rotatably mounted on the axle, a wheel hub rotatably mounted on the driving member and anchor member, brake mechanism for frictionally connecting the hub to the anchor member including a brake operating member, a variable speed transmission connecting the driving member to the hub including longitudinally shiftable gears, and means mounted in the anchor member bearing in the brake operating member for shifting said gears.

7. A variable speed transmission and brake unit for vehicles including a stationary axle, an anchor member fixed thereon, a driving member rotatably mounted on the axle, a wheel hub rotatably mounted on the driving member and anchor member, brake mechanism for frictionally connecting the hub to the anchor member, a variable speed transmission connecting the driving member to the hub including a longitudinally shiftable planet carrier, means slidably mounted in the anchor member for shifting the planet carrier, and means rotatably mounted in the anchor member for actuating the shifting means.

8. A variable speed transmission and brake unit for vehicles including a stationary axle, an anchor member fixed thereon, a driving member rotatably mounted on the axle, a wheel hub rotatably mounted on the driving member and anchor member, brake mechanism for frictionally connecting the hub to the anchor member, a variable speed transmission connecting the driving member to the hub including a longitudinally shiftable planet carrier and a longitudinally slidable sun gear, means slidably mounted in the anchor member and having a swiveled connection with the planet carrier for shifting the same, a brake actuating member traversed by the shifting means and arranged in abutting and interlocking relation with the sun gear, and means whereby backward rotation of the driving member disconnects the transmission and slides the sun gear and brake actuating member in a direction to apply the brake mechanism.

9. In a variable speed transmission and coaster brake for velocipedes, a stationary axle, an anchor member fixedly mounted thereon adjacent one end thereof, a driving member rotatably mounted on the axle adjacent its other end, a wheel hub rotatably mounted on the anchor member and driving member, a transmission member, a clutch member having a threaded connection with the driving member and actuated by forward rotation of the driving member to clamp the transmission member to the driving member, shiftable variable speed gearing connecting the transmission member to the hub, shifting means therefor slidably mounted in the anchor member, and a manually operable member rotatably mounted in the anchor member for actuating the shifting means.

10. In a variable speed transmission and coaster brake for velocipedes, a stationary axle, an anchor member fixedly mounted thereon adjacent one end thereof, a driving member rotatably mounted on the axle adjacent its other end, a wheel hub rotatably mounted on the anchor member and driving member, a transmission member, a clutch member having a threaded connection with the driving member and actuated by forward rotation of the driving member to clamp the transmission member to the driving member, variable speed gearing connecting the transmission member to the hub including a sun gear slidably mounted on the axle and a planet carrier and an orbit gear shiftable as a unit for selectively keying the carrier and orbit to the hub and the transmission member, brake mechanism for frictionally connecting the hub to the anchor member, a brake actuating member in abutting relation to the sun gear, and means whereby backward rotation of the driving member slides the sun gear and brake actuating member in a direction to apply the brake.

11. In a variable speed transmission and brake unit, a driving member, a driven member, a transmission therebetween including shiftable gearing and a clutch, brake means for the driven member including a brake actuating member, shifting means for the gearing serving to prevent rotation of the brake actuating member, and means whereby forward rotation of the driving member closes the clutch and backward rotation thereof operates the brake actuating member including a traversing member, a thrust member prevented from rotation by connection to the brake actuating member, and a detent frictionally connecting the thrust member and traversing member to resist rotation of the traversing member.

12. In a variable speed transmission and brake unit, a driving member, a driven member, a transmission therebetween including shiftable gearing and a clutch, brake means for the driven member including a brake actuating member, shifting means for the gearing serving to prevent rotation of the brake actuating member, means including a traversing member having an inclined connection with the driving member whereby forward rotation of the driving member with respect thereto closes said clutch, and rearward rotation of the driving member with respect thereto operates the brake actuating member, said last means including a thrust member non-rotatably connected to the brake actuating member; and a friction detent connecting the thrust member and traversing member to insure traversal of the latter.

13. In a transmission and coaster brake for velocipedes, a driving member, a driven hub, means including a clutch and a gear train for connecting the driving member to the hub, brake means, means including an element having an inclined connection with the driving member operable responsive to backward rotation of the driving member with respect thereto to apply the brake, and means including a friction detent for resisting rotation of said element, said gear train including a non-rotary gear serving as a transmitter of brake applying forces and as an anchorage for said detent means.

14. In a variable speed transmission, a fixed axle, a cylindrical hub rotatably mounted thereon, a driving member located adjacent one end of the hub, braking means adjacent the other end of the hub, variable speed gearing located intermediate the driving member and the braking means, means including a clutch member for connecting the driving member through the gearing to the hub, a slidable non-rotatable thrust member located between the driving member and the gearing, and means whereby reverse movement of the driving member causes longitudinal movement of the clutch member to slide the thrust member in a direction to apply the brake means.

15. In a variable speed transmission, a fixed axle, a cylindrical hub rotatably mounted thereon, driving means located adjacent one end of the hub, braking means adjacent the other end of the hub, variable speed gearing located intermediate the driving and braking means connecting the driving means to the hub, said driving means including a driving member and a clutch member automatically movable by forward rotation of the driving member to actuate the gearing, a thrust member located between the driving means and the gearing whereby reverse rotation of the driving means causes longitudinal movement of the clutch member and thrust member, and means including an element of the gearing for transmitting the longitudinal movement of the thrust member to actuate the braking means.

16. In a transmission and coaster brake for velocipedes, a driving member, a driving clutch member operable thereby, a hub member, a driven clutch member, a variable speed gear train connecting the driven clutch member to the hub, a fixed anchor member, means slidably mounted thereon for controlling said variable speed gear train, brake means for frictionally connecting the hub to the anchor member, and means actuated by the driving clutch member responsive to backward rotation of the driving member for applying the brake means.

17. In a transmission and coaster brake for velocipedes, a driving member, a driving clutch member threaded thereon, a hub member, a driven clutch member engageable by the driving clutch member upon forward rotation of the driving member, a variable speed gear train connecting the driven clutch member to the hub, a fixed anchor member, means slidably mounted thereon for controlling said variable speed gear train, brake means for frictionally connecting the hub to the anchor member, means actuated by the driving clutch member responsive to backward rotation of the driving member for applying the brake means, and a detent frictionally connecting the driving clutch member to the anchor member to ensure traversal of the driving clutch member upon rotation of the driving member.

BURR W. JONES.